W. F. FOX.
PHOTOGRAPHIC PROCESS.
APPLICATION FILED FEB. 3, 1915.
1,166,123.
Patented Dec. 28, 1915.
Fig. 1,
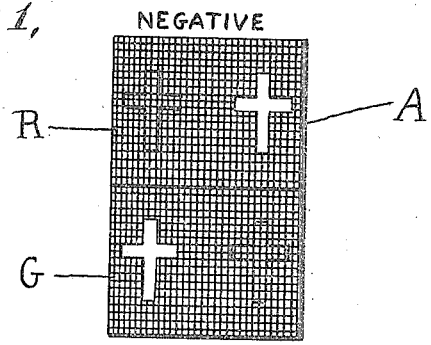
Fig. 2,
PRINT FROM RED NEGATIVE
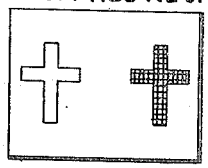
Fig. 3,
PRINT FROM GREEN NEGATIVE
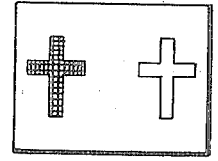
Fig. 4,
IMAGE ON PROJECTING POSITIVE
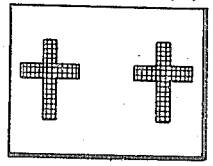
WITNESSES
INVENTOR
William F. Fox
BY
ATTORNEY

UNITED STATES PATENT OFFICE.

WILLIAM FRANCIS FOX, OF NEW YORK, N. Y., ASSIGNOR TO KINEMACOLOR COMPANY OF AMERICA, OF NEW YORK, N. Y., A CORPORATION OF DELAWARE.

PHOTOGRAPHIC PROCESS.

1,166,123. Specification of Letters Patent. Patented Dec. 28, 1915.

Application filed February 3, 1915. Serial No. 5,829.

*To all whom it may concern:*

Be it known that I, WILLIAM FRANCIS FOX, a subject of the King of Great Britain, residing at Beechhurst, in the borough of Queens, city and State of New York, have invented certain new and useful Improvements in Photographic Processes, of which the following is a specification.

The invention relates, generally, to a photographic process for the production of colored pictures, and, while applicable to the production of single photographs in color, is peculiarly adapted for use in connection with the production of colored photographs in continuous series for use in the art of cinematography.

The method of colored moving-picture photography and reproduction as heretofore practised has involved the use of special apparatus (for taking and for projecting) and a special film of substantially twice the length commonly employed in the projection of pictures in monochrome. In the special camera so employed, it has been customary to use a light filter, through which the exposures have been taken, such filter being partly of green and partly of red material, one exposure being taken through the green portion and the next adjacent exposure through the red portion. As a result, each two adjacent images upon the film have been affected, as to color value, by the interposed filter, an image taken through the green portion of the filter having red color-sensations omitted therefrom and an image taken through the red portion of the filter having green color-sensations omitted therefrom. In the projection of moving pictures by means of a positive print made from such a film, a corresponding color-filter is employed, whereby the pictures, as exhibited, are reproduced in substantially the colors by which they were originally characterized. Objections to this method are, *inter alia*, the necessity for special projecting apparatus, involving the use of the color-filter; also the excessive length of the film (approximately twice that used in monochrome moving-picture reproduction), and the high speed at which the reproduction must proceed in order that the colors shall be suitably merged in the pictures as exhibited upon the screen.

One object of my invention, when the same is employed in connection with the art of colored moving-picture photography, is to produce a film which can be exhibited by means of a projecting machine of ordinary construction, *i. e.*, of the character commonly employed for the reproduction of monochrome pictures, and therefore not employing the color-filter such as above referred to.

A further object is to produce a film which can be projected at substantially the speed at which moving-picture films in monochrome are now being projected, thus avoiding the difficulty of excessive speed, ordinarily harmful to both film and projecting machine, which characterized the reproduction of pictures by means of a film of excessive length.

A further object of the invention is to produce a colored moving-picture film each of the photographic images upon which is characterized by substantially the colors appearing in the object originally photographed, such colors being applied by suitable baths, rather than by any process heretofore suggested or employed.

In carrying out my invention, I first produce two negative images, one taken through a green filter and another through a red filter, and from these obtain a positive print, which may be colored in the manner hereinafter described. This is a broad statement of the process, applicable whether the object be to produce a single discrete colored photograph or an extended series of such photographs suitable for moving-picture reproduction.

It being understood that the invention is equally applicable to either, I shall proceed from this point to disclose the same in its application to the production of a film of substantial length, suitable for use in colored moving-picture projection.

By means of a suitable camera, employing a color-filter such as above suggested, a series of images is formed upon a strip of transparent or translucent material coated with panchromatic emulsion, each two images of a series being taken one through the red portion of the filter and the other through the green portion of the filter. Then, either by direct or optical printing. I produce a positive on similar material, impressing upon this two of the negative images, one taken through the green portion of the filter (and to which I shall hereinafter refer as the green image) and the other taken through the red portion of the filter. These images are precisely superimposed upon the positive stock and either upon the emulsion with which the same was originally coated or the first upon that emulsion and the second upon a second coating or similar emulsion over the first coating. Each of the images is colored in manner hereinafter described in detail, so that, as a result thereof and of the precise superimposition of such images, a picture projected by means thereof will display substantially the original colors of the thing or scene photographed.

In the drawings, I have illustrated, and shall hereinafter proceed to describe, the steps involved in a preferred method of practising the invention.

In such drawings, Figure 1 is a plan view of a negative film resulting from the photographing, through alternate red and green filters, of two crosses, one red and the other green, against a white background, the red cross being that at the left; Fig. 2 is a similar view of a positive reproduction, from said negative, of what I term the "red image" thereon; Fig. 3 is a similar view of a positive reproduction, from said negative, of what I term the "green image" thereon; and Fig. 4 is a similar view, illustrating the projecting positive film, bearing thereon an image caused by the superimposition of the two prints illustrated in Figs. 2 and 3.

The first step in the process involves the production of a suitable negative, A, from which a projecting positive may be obtained. Using suitable transparent or translucent material, such, for example, as ordinary pyroxylin stock coated with silver bromid emulsion, extra sensitized to be panchromatic, a series of pictures is taken by means of a camera employing a red and green color-filter, one image, R, being taken through the red portion of the filter, and the next adjacent image, G, through the green portion of the filter. The resulting negative strip is then developed, fixed, washed and dried in well-known manner. The next step is to produce, by means of such negative strip, a positive strip, termed herein a "projecting positive," and this is accomplished by reproducing, also upon transparent or translucent film-stock coated with silver bromid emulsion, not necessarily panchromatic, all of the images upon the negative strip, but superimposing on the positive strip each two adjacent images of the negative strip, one taken through the red filter and the other through the green filter, as above described. In accomplishing this, I employ for the projecting positive, film-stock having preferably the sensitive emulsion upon but one side thereof, and both images may be superimposed upon this emulsion or one image may be imprinted thereon and then a new coating of similar emulsion applied over the first and the second image imprinted upon such new coating. In the latter case, the first coating of emulsion may be waterproofed by a suitable varnish, if desired, before the second coating is applied, but I have found this unnecessary. Whether but a single coating of emulsion or two coatings be employed, the process of producing the positive strip is essentially the same.

The image of the red negative, R, is imprinted upon the positive strip in usual manner, after which such positive strip is developed by means of any suitable developer. After such development, which has resulted in making the latent image visible, the further treatment of the film, during this stage of the process, will depend upon whether or not both images of the negative are to be impressed upon the same coating of emulsion or upon different coatings, as heretofore explained. If but a single coating of emulsion on the positive film-stock is to be employed, which is to be preferred on the score of economy, the developed print is immersed in an ordinary washing bath, containing, however, a small percentage (one per cent.) of acetic acid, the purpose of this bath being to wash out surplus developing solution and to arrest the process of development which would otherwise continue until the last of the developer had been eliminated. This operation will be carried out in the dark-room. The positive film bearing the red image imprinted thereon is then toned (also in the dark-room), this being accomplished by immersing the same in any suitable toning bath, as, for example, iron perchlorid one per cent., potassium ferricyanid one per cent., hydrochloric acid one-half of one per cent. In this bath, the positive print is toned completely and until action upon the silver deposit can be carried no farther. This bath has no effect upon the undeveloped silver bromid (the sensitive portion of the silver emulsion), but the developed image is turned to a bluish green color. Incidentally, certain silver compounds are formed during the toning operation, and these being soluble in sodium thiosulfate, the positive may now be immersed in a bath of this material sufficiently strong, such as a one per cent. solution to dissolve out the surplus silver compounds but not sufficiently strong to affect the silver bromid to appreciable extent. This weak solution actually dissolves out the silver toning residues in a very short time, for example thirty seconds, while in this time there would be no appreciable effect upon the silver bromid. The object of using this thiosulfate bath is to remove metallic compounds which would be affected by subsequent operations; if these silver compounds were not removed, mordanting of the second image, described hereafter, would affect the first, or bluish green image. After this operation, the film may be thoroughly washed and dried (still in the dark-room), after which it may have the second image imprinted upon it, as hereinafter described.

Should it be preferred to use the original coating of emulsion for but one of the two negative prints, reëmulsioning the surface of the positive to receive the second print, the procedure will be essentially that above described, save that after the first print has been impressed upon the positive strip and developed such strip is immersed in the thiosulfate bath, to fix the image, the bath being sufficiently strong, as a ten per cent. solution, to dissolve out the unaltered silver bromid; the print is then washed, and then treated with the toning bath, as above described. The surplus silver compounds are removed in manner above explained, after which the film may be washed thoroughly and dried and thus made ready to receive the second coating of silver emulsion, which, as before stated, may be applied directly over the original coating of emulsion.

In applying the second coating of emulsion, the operation is performed at such a temperature as that such second coating will, in practical effect, combine with the first coating, making essentially but a single homogeneous coating upon the underlying film-stock.

It will be understood that in the process involving the use of a single coating of sensitive emulsion, the effect of the precipitated ferric salts is to desensitize that portion of the film where ferric salts are precipitated. Inasmuch, however, as the action of light proceeds from the surface toward the interior of the sensitive coating, care is taken, in imprinting the first image upon the positive strip, that the exposure be not so great as to affect the entire mass of such coating. As a result, such first image will, in effect, be portrayed in the upper layer of the coating, the emulsion underlying it remaining sensitive, and it is this sensitive portion of the emulsion which is utilized in impressing the second print upon the positive strip, such operation not being interfered with by the image already there, which, as above stated, has been turned a bluish green and which, therefore, but little, if at all, obstructs the passage of light, because the blue image permits the passage therethrough of that portion of the spectrum which is most actinic, that is, the light to which the emulsion is most sensitive. Even if it did, such objection might be overcome either by printing the second image from the opposite side of the film (having reversed the negative as well) or by printing the second image through a blue screen.

The next step of the process is to impress upon the positive strip, and in precise superimposition upon the image already there, the image of the green negative. In doing this, the image upon the green negative should be imprinted very lightly, to avoid too great a predominance of the color to which this image will be changed. A density of image of about one-quarter to one-half the amount of that required for an ordinary black and white negative will ordinarily be found sufficient. After this green image has been so imprinted upon the positive, the positive strip is developed, fixed and washed, any of the usual and well-known developing and fixing baths being employed, save that the latter should not be of a character to harden the gelatin.

As will be understood, the first image impressed upon the positive film is open to the action of any solutions which may be used in the treatment of the second image, as in the particular process under disclosure no attempt is made to protect the same. Consequently, the development of the second image results in a bleaching out and entire obliteration of the bluish green color from the first image, although the image itself remains faintly visible. In order to restore this color to the first image, the film is immersed in a bath containing some ferric salt and an acid. A suitable bath for this purpose would be a weak solution of ferric chlorid and hydrochloric acid. I prefer, however, as simplifying the process, to combine this step of restoring the color to the first image with the step of treating the second image for color, since the bath employed for the latter purpose contains both ferric salt and a suitable acid.

Bleaching or decoloring the first image, by developing the second image, is of importance in the described invention, since thereby the development of the second image in the dark room can be observed and regulated without interference from the first image.

The next step of the process is to color the second image imprinted upon the positive strip, this being a weak image formed by black silver deposit and the process requiring that it should be colored red for coaction with the first image, which has been (or will be) colored bluish green. The red required for a two-color process in conjunction with a bluish green is of such a shade that among the dyes applicable to a process in which the silver salts are changed to a mordant no dye has been found suitable. Nor is a mixture of dyes practicable, since certain dyes will work faster than others, and certain dyes will wash out while others will not. I have discovered, however, that a solution of vanadium chlorid in oxalic acid with potassium ferricyanid will so change the silver as to act as a powerful mordant, and moreover that the color resulting from the action of such solution upon the silver, when used in conjunction with a basic red, forms a perfect complementary color to the bluish green characterizing the first image. All basic red dyes are of a crimson-pink color, and in a three-color process this would be very desirable for the red picture. In a two-color process, however, such as that under disclosure, a dye of this color would turn the blacks to violet and the greens to a reddish blue, and the whole picture is given an undesirable violet-pink tint. The action of vanadium chlorid on the image which is treated results in turning the same to a yellow color, and if after such treatment the positive were immersed in a thiosulfate bath, the brilliancy of the yellow would be increased. In a three-color process, this color would be suitable for the yellow image of such a process, but in a two-color process, such as that under disclosure, no color gradation could be obtained, as portions of the image which should be red, or one of the grades of red, would be yellow, and blacks would be a brilliant green, since the yellow would overlie the bluish green of the first print. Under the present process, the yellowish color given the image of the second print is availed of in conjunction with a basic color (either of which alone would be unsuitable), which, when so combined, will give the correct complementary color to the underlying bluish green of the image first printed.

It should be understood that the coloring of the second image, in the present case, depends upon the conjoint action of the vanadic salts, precipitated in the film, and the basic red dye. Processes are known in which the silver image is toned and colored green by a bath containing vanadium chlorid and iron, after which a liquid red dye is used, which colors the clear parts and to some extent the light green parts, but not the dark green parts. In that case, however, acid dyes are used, which cannot take effect on the image treated with the vanadium chlorid solution, the desire being to dye red those parts which contain little or none of the vanadic salt. When a basic dye is used, however, as described herein, an opposite effect is obtained, since such a dye takes effect on the image mordanted by the vanadium chlorid solution, and not elsewhere. Among the suitable basic dyes are rhodamin, azin red, acridin red and saffranin. Accordingly, in the present process, after the second image has been imprinted upon the positive, as above described, and developed, fixed and washed, it is next immersed in a bath which will not only turn the image of the second print yellow but will also act upon the silver deposit to form a mordant, preparing it to receive a suitable dye. Such a bath may be compounded as follows:—

| Vanadium chlorid | 2 ounces |
| Ferricyanid of potassium | 2 ounces |
| Oxalic acid | 2 ounces |
| Water | 1,000 ounces |

The film is allowed to remain immersed in this bath for a sufficient time for the whole of the silver deposit in the gelatin to be acted upon. This will require from fifteen to thirty minutes. After removal from the bath, the film is washed in ordinary water, and thereafter the surplus silver compounds may be removed by means of the usual thiosulfate bath.

If, now, assuming that previous to this coloring step of the process the positive film bearing the first image thereon shall not have been treated with ferric chlorid and hydrochloric acid as above described, the color blanched out of the first image by the action of the alkali developer will be restored thereto, the bath last described containing both necessary ingredients for that purpose, to wit, ferricyanid and oxalic acid. Additionally, however, due to the vanadium chlorid in such bath, the black silver deposit of the second printed image on such positive will have been changed to yellow. The film may now be fixed and washed in manner hereinabove described, and thereafter immersed in a weak solution of a basic dye (one of the reds), which will immediately begin to color those portions of the film affected by the second printing operation, but which will not be taken up at all by the portions of the film affected by the first printing operation. In other words, although there are two images open to the dye, only one of these is susceptible to it and will, therefore, be affected by this dyeing step of the process. When the picture upon the positive film, resulting from both imprints thereon, comes up to the correct colors, the film is washed in water slightly acidulated by acetic acid, thus clearing any portions of the picture which should be white. The film may then be dried. when it will be ready for use in a suitable projecting machine or otherwise, as desired.

Theoretically, of course, a three-color process would be expected to give better color values in the finished product, the colors used being blue, yellow and a deep pink. In the present process, the last two colors are combined to form one color in one of the prints, and this is complementary to the bluish green used in the other. And the possibility of so combining these colors is due to the treatment with vanadium chlorid. The invention is not, however, to be limited to the combining of the particular colors above referred to, as, so far as I am aware, I am the first to use vanadium chlorid in the manner specified to convert the silver deposit of a photographic image into a mordant adapting it to receive a basic dye of any color.

Having now described my invention, what I claim as new therein and desire to secure by Letters Patent is as follows:—

1. A photographic process involving the production of a negative of two images from one of which certain color-sensations have been omitted and from the other of which certain other complementary color-sensations have been omitted, imprinting one of said images upon transparent or translucent sensitized material, imprinting the other of said images upon said material in registry with the first image imprinted thereon, coloring one of said images, with a color corresponding to the sensations omitted from the corresponding negative, and coloring the other of said images by the use of a basic dye, to a color corresponding to the sensations omitted from the corresponding negative, substantially as set forth.

2. A photographic process involving the production of a negative of two images, one taken through a red filter and the other taken through a green filter, imprinting the first mentioned of said images upon transparent or translucent sensitized material, coloring said image bluish green, imprinting the other of said images upon said material in registry with the first image imprinted thereon, and imparting to said second image, by the use of a basic dye, a red color, substantially as set forth.

3. A photographic process involving the production of a negative of two images from one of which certain color-sensations have been omitted and from the other of which certain other complementary color-sensations have been omitted, imprinting one of said images upon transparent or translucent sensitized material, coloring said image with a color corresponding to the sensations omitted from the corresponding negative, imprinting the other of said images upon said material in registry with the first image imprinted thereon, decoloring the first-named image, restoring color thereto, and coloring said last-named image with a color corresponding to the sensations omitted from the corresponding negative, substantially as set forth.

4. A photographic process involving the production of a negative of two images from one of which certain color-sensations have been omitted and from the other of which certain other complementary color-sensations have been omitted, imprinting one of said images upon transparent or translucent sensitized material, coloring said image with a color corresponding to the sensations omitted from the corresponding negative, imprinting the other of said images upon said material in registry with the first image, applying a mordant thereto, and coloring said last-named image by means of a basic dye, with a color corresponding to the sensations omitted from the corresponding negative, substantially as set forth.

5. A photographic process involving the production of a negative of two images from one of which certain color-sensations have been omitted and from the other of which certain other complementary color-sensations have been omitted, imprinting one of said images upon transparent or translucent sensitized material, coloring said image with a color corresponding to the sensations omitted from the corresponding negative, imprinting the other of said images upon said material in registry with the first image, decoloring said first image, immersing said material in a bath which will recolor said first image and act as a mordant for said second image, and applying a basic dye to said second image, to impart a color thereto corresponding to the color sensations omitted from the corresponding negative, substantially as set forth.

6. A photographic process involving the production of a negative of two images from one of which certain color-sensations have been omitted, and from the other of which certain other complementary color-sensations have been omitted, imprinting one of said images upon transparent or translucent sensitized material, developing and coloring said image with a color corresponding to the sensations omitted from the corresponding negative, imprinting the other of said images upon said material in registry with the first image, developing said second image with a developer, such as simultaneously to decolor the first, simultaneously restoring color to said first image and mordanting said second image, and dyeing said second image, substantially as set forth.

7. A photographic process involving the production of a negative of two images, one taken through a red filter and the other through a green filter, imprinting the first mentioned of said images upon transparent or translucent sensitized material, developing said image, and toning the same to a bluish green color, imprinting the other of said images upon said material in registry with the first image, developing said second image with a developer such as simultaneously to decolor the first, treating said material with a bath having a composition such as to simultaneously restore color to said first image and mordant said second image, and dyeing said second image with a basic red dye, substantially as set forth.

8. A photographic process involving the production of a negative of two images, one taken through a red filter and the other through a green filter, imprinting the first mentioned of said images upon transparent or translucent sensitized material, coloring said image bluish green, imprinting the other of said images upon said material in registry with the first image, treating said second image to simultaneously turn the same yellow and make it receptive of dye, and applying to said second image a color which combined with the yellow tone thereof will be complementary to the bluish green color of said first image, substantially as set forth.

9. A photographic process comprising the production of two negative images, from one of which certain color sensations have been omitted and from the other of which complementary color sensations have been omitted, imprinting one of said images upon transparent or translucent sensitized material, coloring the print with a color corresponding to the sensations omitted from the corresponding negative, imprinting the other of said images upon said material in registry with the first image, applying a mordant thereto which will impart a certain color to said image, and applying a suitable basic dye, of such a color as to combine with the color imparted by the mordant to impart to said last-named image a color complementary to that of the first image, while not coloring the portion of the print which has not been mordanted, substantially as set forth.

10. A photographic process involving the production of a negative of two images from one of which green color-sensations have been omitted and from the other of which red color-sensations have been omitted, imprinting the first mentioned of said images, upon transparent or translucent sensitized material, coloring said image a bluish green, imprinting the other of said images upon said material in registry with the first image, and applying thereto a color in which yellow and deep pink are combined, by treating said second image with a bath adapted to turn it yellow and also to mordant it, and applying a basic red dye thereto, substantially as set forth.

11. A photographic process involving the production of an image upon transparent or translucent sensitized material, treating the same with vanadium chlorid and potassium ferricyanid, and coloring the same by means of a basic dye, substantially as set forth.

12. A photographic process comprising the production of two negative images, one taken through a red filter and the other through a green filter, imprinting the first mentioned image upon transparent or translucent sensitized material, applying developer thereto, toning the same with a bath adapted to turn the image bluish green, dissolving out silver compounds formed during the toning operation, imprinting the other image upon said material in registry with said first image, developing the second image with an alkali developer and thereby decoloring the first, treating with a bath containing ingredients adapted to restore the color to said first image and to act upon said second print as a mordant for basic dyes, and applying a red basic dye thereto, substantially as set forth.

13. A photographic process comprising the production of two negative images, one taken through a red filter and the other through a green filter, imprinting the first mentioned image upon transparent or translucent sensitized material, applying developer thereto, toning the same with a bath containing ferric salts, adapted to turn the image bluish-green, dissolving out silver compounds formed during the toning operation, imprinting the other image upon said material in registry with said first image, developing the second image with an alkali developer and thereby decoloring the first, treating with a bath containing ferric salts, acid, and vanadic salts, adapted to restore the color to said first image, to impart a yellow color to said second image, and to mordant the latter for basic dyes, and applying a red basic dye thereto, substantially as set forth.

14. A photographic process involving the production of an image upon transparent or translucent sensitized material, coloring said image, recoating said material with sensitive emulsion, imprinting upon such recoat another image in registry with the first image, developing said second image with a developer such as simultaneously to decolor the first, restoring color to said first image, and coloring the second with a color complementary to that of the first image, substantially as set forth.

15. A photographic process involving the production of an image upon transparent or translucent sensitized material, coloring said image, recoating said material with sensitive emulsion, imprinting upon such recoat another image in registry with the first image, developing said second image with a developer such as to simultaneously decolor the first, restoring color to said first image, treating said second image with a mordant, and coloring the same with such a basic dye
5 as to impart to said second image a color complementary to that of said first image, substantially as set forth.

This specification signed and witnessed this 30th day of January, 1915.

WILLIAM FRANCIS FOX.

Witnesses:
   J. O. EDMONDS,
   I. McINTOSH.